July 7, 1970 W. H. ENNERS 3,519,217

REEL HUB FOR MAGNETIC TAPE TRANSPORTS

Filed Jan. 2, 1969 2 Sheets-Sheet 1

INVENTOR
WARREN H. ENNERS

BY
Laurence J. Marhoefer
ATTORNEY

July 7, 1970 W. H. ENNERS 3,519,217

REEL HUB FOR MAGNETIC TAPE TRANSPORTS

Filed Jan. 2, 1969 2 Sheets-Sheet 2

INVENTOR
WARREN H. ENNERS

BY Laurence J. Moshaefer
ATTORNEY

United States Patent Office 3,519,217
Patented July 7, 1970

3,519,217
REEL HUB FOR MAGNETIC TAPE TRANSPORTS

Warren H. Enners, Farmingdale, N.Y., assignor to Potter Instrument Company, Inc., Plainview, N.Y., a corporation of New York Filed Jan. 2, 1969, Ser. No. 788,430
Int. Cl. B65h *17/02*
U.S. Cl. 242—68.3 10 Claims

ABSTRACT OF THE DISCLOSURE

The specification and drawings disclose a reel hub for magnetic tape transports in which an expansible shoe is formed integrally with the base ring or disk against which the reel presses when in position.

BACKGROUND OF THE INVENTION

The invention relates to a hub for locking a magnetic tape reel to a servo motor on a magnetic tape transport and, more particularly, to an improved hub which is simple and economical to manufacture.

In a magnetic tape transport, the tape reel is commonly secured to the reel servo motor shaft by an expansible hub secured to the motor shaft. In its contracted position, the diameter of the hub is small enough to permit the reel to be slipped on it easily. When the reel is in place, it rests against a disk whose periphery extends beyond the contracted hub. The hub is then expanded so that it tightly engages the reel and thereby secures the reel to the motor shaft. Such expansible hubs are generally satisfactory in terms of performance and user convenience but are relatively complex and expensive to manufacture.

An object of this invention is to provide an expansible reel hub which retains the advantages of the prior art hubs yet is simple in design, economical to manufacture, and reliable in operation.

SUMMARY OF THE INVENTION

Briefly, this invention contemplates the provision of a magnetic tape reel hub in which the expansible shoe or a pair of expansible shoes and the disk against which the reel rests when in position are an integrally formed unit.

BRIEF DESCRIPTION OF THE DRAWINGS

Having briefly described this invention, it will be described in greater detail along with other objects and advantages in the following detailed description of a preferred embodiment which may be best understood by reference in the accompanying drawings. These drawings form part of the instant specification and are to be read in conjunction therewith. Like reference numerals are used to indicate like parts in the various views.

DESCRIPTION OF THE PREFERRED EMBODIMENTS

Figure 1:
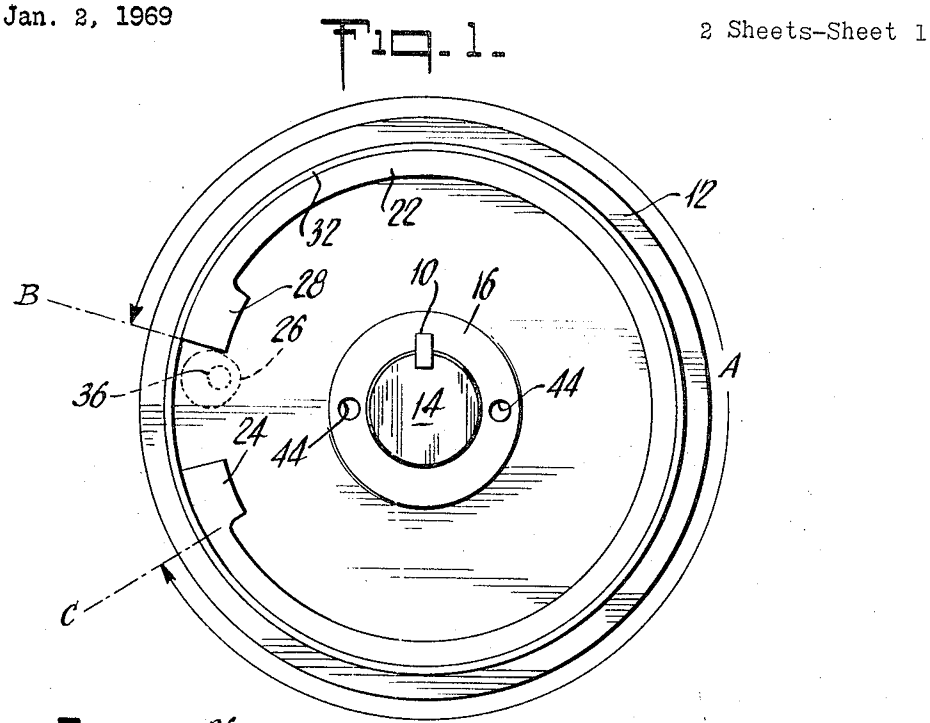
FIG. 1 is a plan view of a reel hub constructed in accordance with this invention with its cover plate removed.

Referring now to the drawings, a key 10 secures a disk 12 to a shaft 14 of a tape reel servo motor (not shown).

The key 10 fits in a keyway cut in an inner hub 16 on the disk 12 and in a similar keyway cut in the shaft 14.

An angular ring 22, which serves as an expansible shoe, is formed integrally with the disk 12. The disk 12 and ring 22 may be machined from a piece of suitable bar stock material. An aluminum alloy that possesses resilient properties such as Alcoa 2024 T351 is suitable. Alternatively, the disk 12 and ring 22 may be cast from a material having suitable resilient properties.

The ring 22 is free from the disk 12 through an arc of about 280 degrees denoted in FIG. 1 by the arrow A extending from line B to line C. It should be noted that the ring 22 is joined integrally to the disk 12 in a region at one end of the ring 22 demarked 24 of FIG. 1. If the disk 12 and ring 22 are machined from a piece of bar stock, the ring 22 can be conveniently cut free from the disk 12 with a suitable power operated saw. Advantageously, the inner hub 16 is formed integrally with the disk 12 also.

A cam 26 secured to a handle 25 engages the other end of the ring 22 demarked 28. As the cam 26 rotates it forces the ring 22 outwardly, forcing a flexible band 32 that surrounds the ring 22 into friction engagement with a tape reel 34 (shown in partial section in FIG. 2). A pin 36 pivotally secures the handle 28 to a cover plate 38. Screws 42 which engage threaded holes 44 secure the cover 38 to the disk 12. While a lever operated cam has been shown in the specific embodiment of the invention enclosed herein, it will be appreciated that other suitable mechanisms known in the art such as lever operated wedges, for example, may be employed to force the ring 22 outwardly. Advantageously, in manufacturing this improved reel hub, the ring 22 is expanded and then machined to a true circle so that it uniformly engages the reel in its expanded position.

Figure 2:
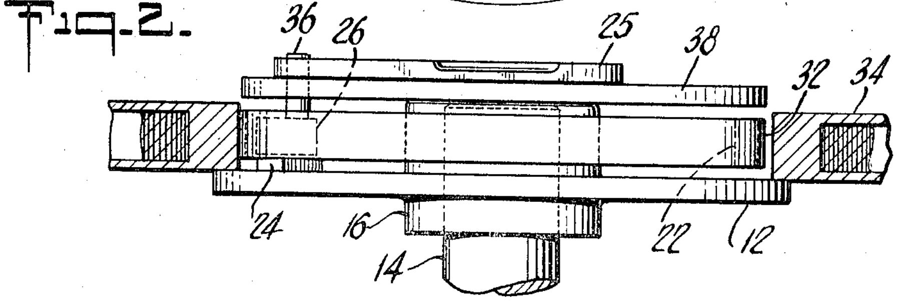
FIG. 2 is a plan view of the reel hub shown in FIG. 1 with the cover in place.
Figure 3:
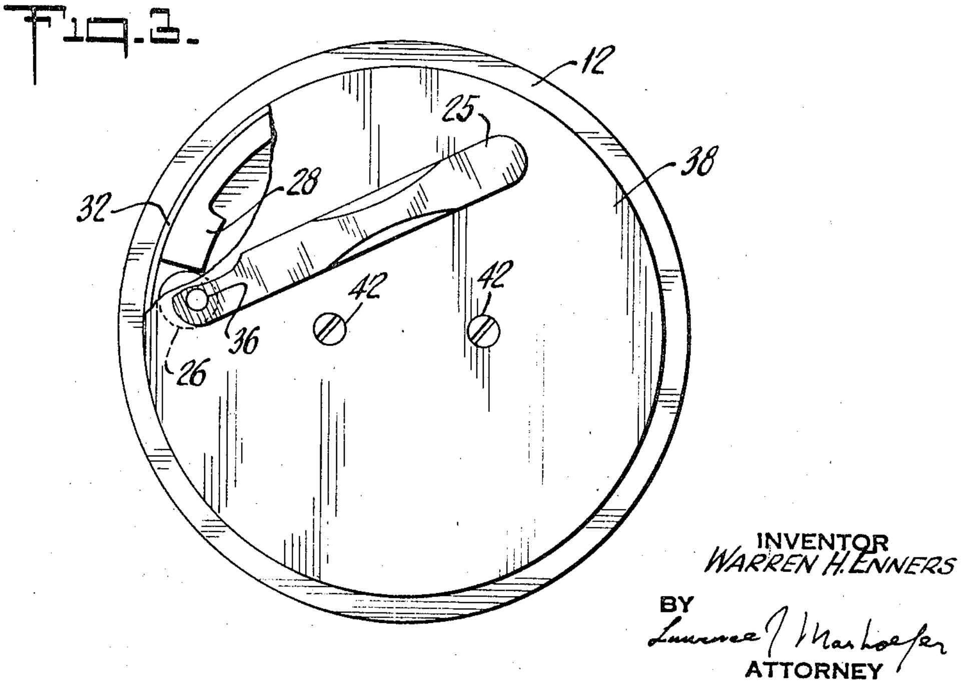
FIG. 3 is a side elevation of the reel hub shown in FIG. 2.
Figure 4:
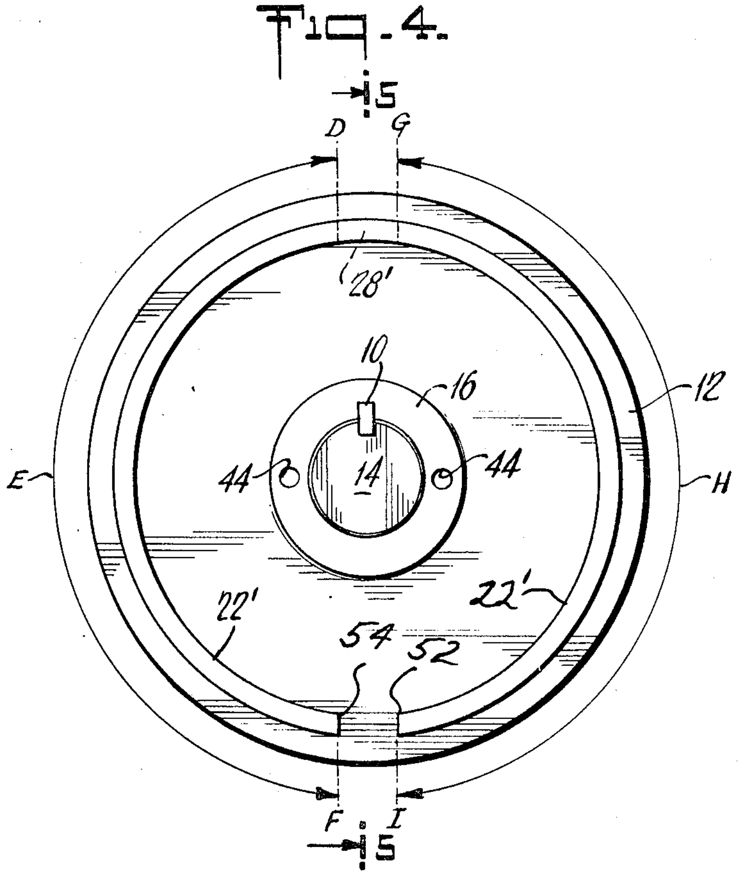
FIG. 4 is a view similar to FIG. 1 of another embodiment of the invention.
Figure 5:
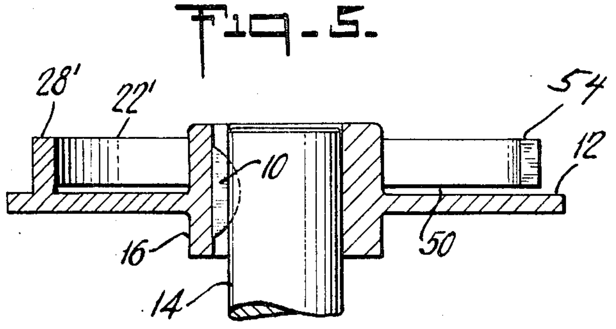
FIG. 5 is a sectional view taken along the line 5—5 of FIG. 4.

Referring now to FIGS. 4 and 5 of the drawings, in this alternate embodiment of the invention a pair of semi-circular rings 22' are formed integrally with the disk 12 rather than a single ring 22 as in FIGS. 1 through 3. The rings 22' are integrally joined to the disk 12 in the region 28' and are free of the disk 12 through the arcs denoted by arrows E and H. A suitable mechanism known in the art may be employed for forcing the rings 22' to expand and engage the tape reel. Conveniently, a tapered wedge which forces the ends 52 and 54 apart may be employed for this purpose. As explained in connection with FIGS. 1 through 3, the outer surface of the shoes 22' can advantageously be machined to form a true circle in their expanded position so that they uniformly engage the magnetic tape reel.

Thus it will be appreciated that the objects of the invention have been accomplished by making the expansible shoe or shoes integrally with the disk 12. The reel hub is not only economical to manufacture but is also reliable in its operation.

It will be understood that certain features and subcombinations are of utility and may be employed without reference to other features and subcombinations. This is contemplated by and is within the scope of the claims. It is further obvious that various changes may be made in details within the scope of the claims without departing from the spirit of the invention. It is, therefore, to be understood that this invention is not to be limited to the specific details shown and described.

What is claimed is:

1. A hub for securing a tape reel to a servo-motor shaft on a magnetic tape transport comprising in combination:

a disk, means for securing said disk to the servo-motor shaft, at least one expansible shoe integrally joined to said disk, and means for moving said shoe between a contracted position and an expanded position.

2. A hub as in claim 1 wherein there are two expansible shoes integrally joined to said disk.

3. A hub as in claim 1 wherein said shoe forms a true circle in its expanded position.

4. A hub as in claim 2 wherein said shoes form a true circle in their expanded position.

5. A hub as in claim 1 wherein said means for securing said disk to said servo-motor shaft includes an inner hub formed integrally with said disk.

6. A hub as in claim 2 wherein said means for securing said disk to said servo-motor shaft includes an inner hub formed integrally with said disk.

7. A hub as in claim 3 wherein said means for securing said disk to said servo-motor shaft includes an inner hub formed integrally with said disk.

8. A hub as in claim 4 wherein said means for securing said disk to said servo-motor shaft includes an inner hub formed integrally with said disk.

9. A hub as in claim 1 wherein said disk and shoe are made of a resilient aluminum alloy.

10. A hub as in claim 2 wherein said disk and shoe are made of a resilient aluminum alloy.

References Cited

UNITED STATES PATENTS

| | | | |
|---|---|---|---|
| 3,154,262 | 10/1964 | Cohen et al. | 242—68.3 |
| 3,272,450 | 9/1966 | Pendleton | 242—68.3 |

NATHAN L. MINTZ, Primary Examiner